United States Patent [19]

Marshall

[11] 4,197,233

[45] Apr. 8, 1980

[54] ANTI-FOULING AND ANTI-SLIMING COATING MATERIAL

[75] Inventor: David W. Marshall, North Reading, Mass.

[73] Assignee: Kennecott Copper Corporation, New York, N.Y.

[21] Appl. No.: 886,951

[22] Filed: Mar. 15, 1978

[51] Int. Cl.$^2$ ............................................. C08L 63/00
[52] U.S. Cl. ............................ 260/37 EP; 260/37 M
[58] Field of Search ........ 260/37 M, 37 EP, 830 TW; 106/15 R

[56] References Cited

U.S. PATENT DOCUMENTS

| | | | |
|---|---|---|---|
| 3,219,505 | 11/1965 | Hilding | 106/15 |
| 3,299,169 | 1/1967 | Smith | 260/830 |
| 3,983,075 | 9/1976 | Marshall et al. | 260/37 M |
| 3,993,707 | 11/1976 | Cummings | 260/37 EP |

OTHER PUBLICATIONS

Lee et al.; Handbook of Epoxy Resins; McGraw-Hill; 1967; pp. 4-58, 4-59, 4-60, 4-61.

*Primary Examiner*—Lewis T. Jacobs
*Attorney, Agent, or Firm*—John L. Sniado; Anthony M. Lorusso

[57] ABSTRACT

A polymeric composition containing copper flake in sufficient quantities to render the entire thickness of the polymeric composition electrically conductive. The copper flake is treated to remove oxides and reacted with conventional epoxy resins modified with an epoxidized polyol (polyglycol). The formulation not only exhibits outstanding anti-fouling properties but also exhibits anti-sliming properties.

The composition is useful as a gel coat and when utilized on ships, boats, and other water craft, a vessel results which requires no additional anti-fouling or anti-sliming treatment for several years. The composition can also be used to great advantage as a liner for pipes and conduits used to transport salt or fresh water where fouling of the pipes is a problem.

In one embodiment of the invention, a composition is disclosed which will cure under water. This particular formulation can be used to great advantage in patching holes in copper clad hulls and the like while the vessel is in water.

9 Claims, 6 Drawing Figures

ANTI-FOULING AND ANTI-SLIMING COATING MATERIAL

BACKGROUND OF THE INVENTION

This invention relates to a method and composition for reducing fouling and sliming of submerged objects or marine structures for extended periods of time.

The fouling of boat hulls and other objects immersed in sea water is a well-known problem. Fouling is a term used to describe the damage caused by the growth of certain marine macro-organisms such as barnacles, mollusks, incrusting bryozoans, annelids, hydroides, algae, etc. It is well-known that these organisms are highly susceptible to copper. Accordingly, for centuries sailing vessels have been clad with copper hulls. More recently copper has been applied to hulls in the form of paints, polymers, or copper containing polymers.

Perhaps the most common method of preventing the fouling of a boat hull, particularly on small crafts, is the use of anti-fouling paints. Such paints are applied to all surfaces of the hull exposed to water for any prolonged period of time. Indeed, even fiberglass hulls, which otherwise do not require painting, are normally painted at the beginning of each boating season with an anti-fouling paint on areas of the hull which will become exposed to water for long periods of time during the boating season. It would, of course, be highly desirable to provide a gel coat for fiberglass hulls which is anti-fouling for several years. The polymeric composition of the present invention can be utilized as such a gel coat.

In addition to being anti-fouling, the gel coat composition of the present invention also exhibits resistance to sliming. Sliming is a term used to describe the opaque film which forms on the surface of submerged objects. Sliming is generally caused by micro-organisms such as bacteria. Indeed, when a vessel is placed in salt water, initially bacteria becomes associated with the surface of the object to form a film of slime. The association of the bacteria is followed by an association of a biotic progression of diatoms, hybrides, algae, bryozoans, protozoans, and finally macro-organisms (foulents). It is desirable to reduce sliming for many reasons. Obviously, the presence of slime contributes to problems associated with foulents such as increasing drag, increasing fuel consumption, etc. However, perhaps more significant is the fact that macro-organisms tend to be rugophilic and settle on roughened surfaces in preference to smooth surfaces. Thus, there is a view that marine slimes precondition the surface of submerged objects in a manner that stimulates the settling of foulents. Thus, slime provides the physical substrate and possibly a nutriant source which encourages the attachment of macroscopic plants and animals. Obviously, it would be desirable to provide a material which not only prevents fouling but which also reduces sliming. This fact is significant because anti-fouling paints are not generally characterized as being anti-sliming. The conventional method of preventing sliming is to chemical treat the water, i.e., chlorination or ozonation.

Of course, fouling and sliming is also a problem which occurs when objects are in contact with fresh water. Thus, the gel coat of the present invention can be used to coat objects which remain in contact with fresh water for prolonged periods of time.

As has been stated above, a common procedure for preventing a boat hull from fouling is to apply an anti-fouling paint. Typically, an anti-fouling paint contains an anti-fouling metal such as copper which leaches into the water to form copper ions. These ions are deadly to the foulents. As one particle of the anti-fouling metal dissolves, another particle is exposed to solvolysis. This leaching is rapid (when compared to the leaching rate of solid copper) and varies with such factors as coating age, temperature of the water, salinity of the water, etc.

Quantitive information indicates that in most cases, initially the leaching rate of anti-fouling paints is excessive and results in overkill. Furthermore, the rapid leaching leads to the concentration of the toxic metallic components in quantities well above that normally present in the ocean. Of course, the longer the object to which the anti-fouling paint has been applied is in the water, the less metallic material is available to prevent fouling.

Copper cladding on the other hand leaches copper ions very slowly. However, this slow leaching is still effective in killing foulents. Furthermore, copper cladding is effective as an anti-foulent for many years. Indeed, it can be stated that anti-foulents that leach slowly last longer. It would be highly desirable to provide an anti-fouling gel coat material which has a slow leach rate. The gel coat of the present invention is such a material.

SUMMARY OF THE INVENTION

The present invention is a copper containing anti-fouling gel coat which includes copper flake that has been treated to remove traces of copper oxide. A sufficient amount of copper flake is utilized so the entire thickness of the gel coat is electrically conductive. The polymer which forms the gel coat is a conventional epoxy resin modified with an epoxidized polyol. This formulation exhibits outstanding anti-fouling properties as well as anti-sliming properties when utilized as a gel coat on an object exposed to sea water. The formulation is flexible, has excellent adhesive properties, contains no solvents, and can be either molded or spread as a coating. In one important embodiment of the invention, additives are included in the composition which permit the gel coat to be cured under water. This embodiment has advantages when used to plug up holes in copper clad hulls and the like while the hulls are in water.

Accordingly, it is an object of the invention to provide a material for use on objects exposed to salt water which will reduce fouling and sliming of the objects.

Another object of the invention is to provide a gel coat which has anti-fouling and anti-sliming properties.

Another object of the present invention is to provide an anti-fouling material which when applied to a vessel will exhibit anti-fouling properties for many years.

Another object of the invention is to provide an anti-fouling gel coat which has a slow leach rate.

Another object of the invention is to provide an anti-fouling, anti-sliming lining for conduits, pipes and the like used to transport salt water.

DESCRIPTION OF THE PREFERRED EMBODIMENTS

Figure 1:
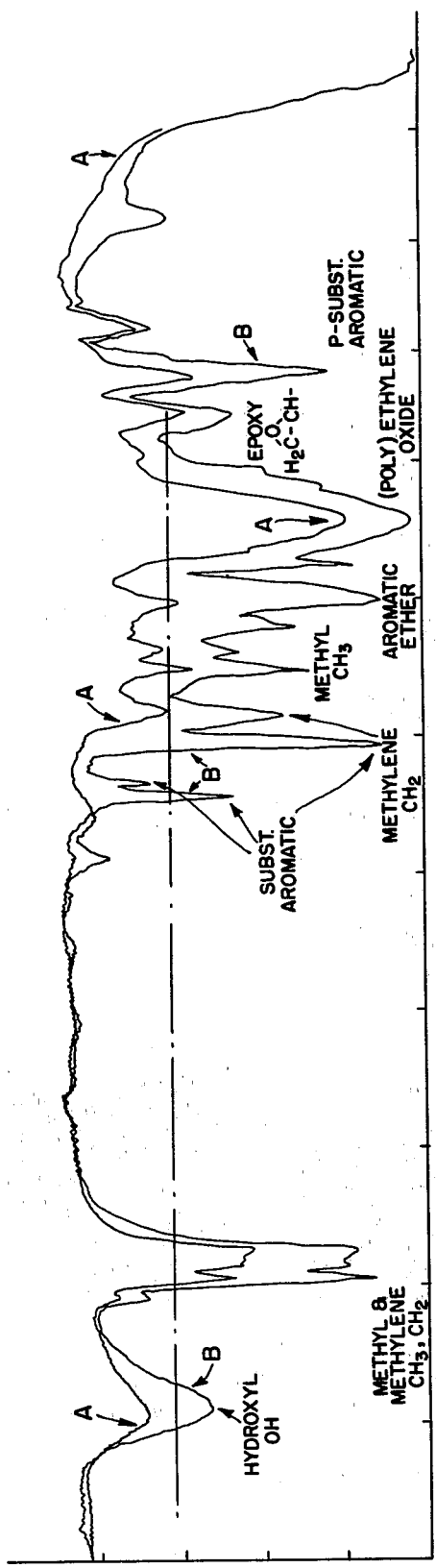
FIG. 1 is a graph showing an infa-red analysis of two commercial epoxidized polyols used as a modifier in the anti-fouling and anti-sliming formulations, curve labeled A is Dow Chemical's D.E.R. 732, curve B is Ciba-Geigy's Araldite 508.

At the outset, the invention is described in its broadest overall aspects with a more detailed description following.

The present invention relates to a composition which can be applied as a gel coat. The gel coat has anti-fouling and anti-sliming properties; and thus, can be used as a coating for any surface of an object which comes in contact with salt water and which should have anti-fouling properties. In its broadest overall aspect, the gel coat is an epoxy resin containing a group such as a polyol which holds copper flake and releases it slowly into the water.

The Copper Flake

In order for the gel coat of the present invention to be useable as an anti-fouling gel coat, it is important that it contain a sufficient amount of copper flake so that the entire thickness of the gel coat is electrically conductive. It is also important that the copper flake be treated or cleaned to remove impurities and/or oxides. Details of this treatment appear below and can also be found in U.S. Pat. No. 3,983,075 to Marshall et al. entitled "Copper Filled Conductive Epoxy", the teachings of which are incorporated herein by reference.

Copper flakes having a particle size of 30 to 200 microns are suitable for use in the gel coat of the invention. Copper flakes such as Belmont Smelting and Refining Company's No. 250 flake copper (a 250 mesh approximately 58 microns particle size copper flake with a purity of at least 99.99% copper) are mixed with enough of a solvent such as chlorinated alkylenes, e.g., trichloro ethylene so that eight volumes of a solvent are used per unit volume of flakes. Higher ratios can be used, (up to 12 volumes of solvent per unit volume of flakes); but, it has been found that generally sufficient cleaning is achieved by utilizing additional aliquot parts rather than employing greater amounts of the solvent. For example, by using a solvent flake ratio of 5:1 and by repeating the process, it has been found that the cleaning action is enhanced.

The obtained mixture is stirred for about ½ hour and then filtered through an appropriate filter device such as a Buchner funnel. After filtering, the flakes are rinsed in the funnel several times with denatured alcohol, methyl alcohol, or ethyl alcohol. After the first step, the copper flakes while still damp with alcohol are removed from the funnel and mixed with about 1 quart or 1 molar citric acid and stirred continuously for a prolonged time, e.g., for about 12 hours. This mixture is again filtered in the funnel and rinsed thoroughly with distilled water until the rinse solution is clear. Again, the flakes are rinsed with denatured alcohol and filtered to remove the excess fluid. Drying of the damp copper flakes is carried out in a vacuum oven and generally a temperature at about 100° F. is employed. It has been found that the flakes are dry and powdery after drying; but, it is important that these flakes be stored in a clean dry container until ready for use. It is also important that moist air be excluded from the storage vessel because of the tendency of copper to oxidize readily.

The Epoxy Resin

In general, epoxy resins (also called epiepoxide, and ethoxyline resins), are the condensation products of epichlorohydrin with diphenols, such as biphenol A, and have the structure shown below.

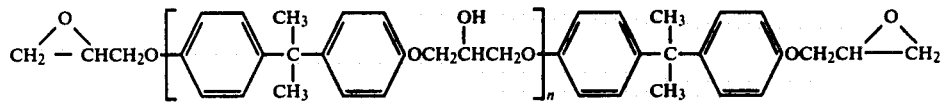

The molecular weights of these resins is between the range of 360–4000. The resins, in the illustrated uncured state, are thermoplastic and range from low viscosity liquids (n=0) to high melting point brittle solids (n=10). An epoxy resin may be defined as a polyether containing a highly reactive epoxy or oxirane group at each terminal, separated by an alternating aromatic and aliphatic system containing hydroxyl groups.

The epoxide group behaves as a highly unsaturated system; and therefore, can react by addition with a wide variety of materials, especially those containing polar (active hydrogen) groups. Hence, except for being much more reactive, the epoxy group acts in a manner very similar to that of an olefin.

Epoxy resins useable in the present invention have a low viscosity 100–20,000 cps, although resins having viscosity less than 12,000 are preferred since they allow higher loadings of a filler material such as the copper flakes. Commercially available epoxy resins suitable for use in the present invention include:

| Manufacturer | Resin Name |
|---|---|
| Ciba-Geigy | Araldite 507 |
| | Araldite 502 |
| | Araldite 6004 |
| | Araldite 6005 |
| Shell Chemical | Epon 815 |
| | Epon 826 |
| | Epon 820 |
| Dow Chemical | D.E.R. 334 |
| | D.E.R. 335 |
| | D.E.R. 321 |
| | D.E.R. 332 |
| Celanese | Epi-Res 504 |
| | Epi-Res 5077 |
| | Epi-Res 5091 |
| General Mills | Gen Epoxy M170 |
| | Gen Epoxy M189 |
| | Gen Epoxy M245 |
| | Gen Epoxy 175 |

The Polyglycol

An important feature of the present invention is to include a reactive group such as a polyglycol (polyol) in the cured epoxy resin which when in the presence of sea water will react with copper to complex it. It is believed that this reactive group is not completely reacted with the epoxy resin and hence, some of the —OH groups are able to react with the copper flake in sea water to form either a basic cupric carbonate $CuCO_3Cu(OH)_2$ or cupric butyrate $Cu(C_4H_7O_2)_2 \cdot 2H_2O$ or some other metal-organic compound which depends on the structure of the polyglycol. It is believed that the copper complex prevents sliming. At this point, it should be noted that the purpose of the polyglycol is to create a reaction product which inhibits slime formation. Polyglycols are desirable because they react easily with epoxy resins. Indeed, epoxy resins containing polyglycols are available commercially. A representative list of such resins appears below:

| Manufacturer | Trade Name | Equivalent Epoxy Weight |
|---|---|---|
| Ciba-Geigy | Araldite 508 | 400–455 |
| Dow Chemical | D.E.R. 732 | 305–335 |
| Dow Chemical | D.E.R. 736 | 175–205 |
| General Mills | Gen-Epoxy G-192 | 175–205 |
| General Mills | Gen-Epoxy G-320 | 305–335 |

As used throughout this specification and claims, all percentages and parts are by weight unless otherwise specified.

The equivalent epoxy weight is the weight of a molecule per epoxy reactive group. For example, if a resin contains 2 epoxy groups per molecule, the equivalent epoxy weight is the weight of the molecule divided by 2. As is known in this art, the equivalent epoxy weight is utilized in order to ascertain the correct amount of curing agent.

The preferred resin is Araldite 508 which is an epoxy resin containing polypropylene glycol glycidyl ether. This resin has the following generalized formula:

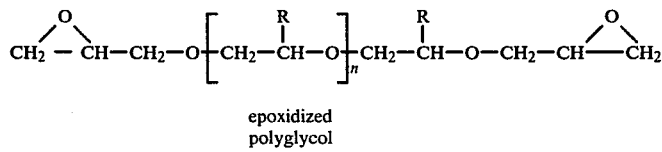

epoxidized polyglycol where n is a number between 2–7, the epoxidized polyglycol resin has a molecular weight between the range of 260–1000, and R is hydrogen or an aliphatic hydrocarbon containing 1–6 carbons.

Curing Agents

As is well known, epoxy resins can be cured with amines, amides, anhydrides, or catylitic agents such as boron tri-fluoride complexes and other Lewis acids.

The amine may be an aliphatic amine such as diethylenetetramine, diethylaminopropylamine, or triethylenetetramine.

Polyamides are also useable as curing agents. In general, the ratio of the epoxy to the curative such as polyamides curative is 70 parts of epoxy to 30 parts of polyamide. However, ratios as low as 50 epoxy to 50 polyamide and as high as 80 epoxy to 20 polyamide can be used.

More specific details on the curing agent appear below.

Aliphatic amines Triethylene Tetramine (TETA) is an aliphatic amine usually used in the ratio of 13 parts by weight to 100 parts resin. Other aliphatic amines such as diethylenetriamine (DETA) aminoethylethanolamine, tetraethylenepentamine, diethylaminopropylamine and the like would also be satisfactory. Proportions of amine to resin can vary from about 4 phr to 30 phr depending on the particular aliphatic amine chosen. Those that cure completely at room temperature such as TETA and DETA are used in proportions less than 15 1 phr and are preferred since elevated temperatures are not needed to cure the resin and the volume of the curing agent is not enough to cause excessive dilution of the copper filled resin. "phr" indicates parts per 100 parts resin.

Ancamine 1510 is a modified cycloaliphatic amine made by Pacific Anchor Chemical Corporation. It has a very low viscosity (0.5 centapoise) and results in a more fluid antifouling compound. Similar compounds are Ancamine MCA and Ancamine 1561. Ancamine 1510 is recommended to be used at 30 phr but may be used from 20–40 phr with slightly reduced physical properties.

DMP-30 is the aromatic-ring-containing aliphatic tertiary amine, tris (dimethylaminomethyl) phenol. It is used in the range of 6 to 10 phr for room temperature, cures with 10 phr being the preferred composition. Benzyldimethylamine, α-methylbenzyldimethylamine and dimethylaminomethylphenol are acceptable substitutes.

Other Additives

Because available epoxy resins modified with glycols such as Araldite 508 tend to be soft when cured with an amine, it is advantageous to include an unmodified epoxy resin in the formulation. For example, the resin D.E.R. 332 has been included in a formulation as follows:

| Araldite 508 | 70 g |
|---|---|
| D.E.R. 332 | 30 g |
| TETA | 13 g |

Other additives include:

Epodil L is a non-reactive liquid hydrocarbon resin that is used primarily as a viscosity reducing diluent. It can be used up to 50% by weight with any resin, but the recommended range is 10–15% by weight.

The Polymer

The polymeric composition is prepared in accordance with procedures that are well known in this art. Prior to being cured, however, the copper flake is added to the reactive mixture. Tests have indicated that to be effective as an anti-fouling coating, a gel coat must contain at least 45% and preferably 50% or more by weight copper. With this amount of copper in the polymer, it would be electrically conductive.

Curing agents would be used in their normal proportions which are readily available in the literature. Thus, for example, for an amine curing agent, the literature suggests using 2-50 parts of amine per 100 parts of an epoxy resin. In general, the curing can be effected from room temperature or up to a temperature of 250° F. A cure at room temperature is achieved at 70° F. for a cure period of 16 hours. Although the resins will harden within this time period, further curing will continue for several weeks or longer. Curing can be accelerated by adding small amounts of tertiary amines or by heating to about 150° F.

Anhydride cured resins are usually cured at a higher temperature such as for 2 hours at 200° F. plus an additional overnight cure at 250° F. and a post cure of 4 hours at 350° F. It has been found, however, that short and lower temperatures cure conditions reduce the possible oxidation of the flakes. At cure temperatures above 250° F., the electrical conductance of the resin is impaired.

The invention is further illustrated by the following nonlimiting examples.

The use of copper filled electrically conductive epoxy resins as antifouling coatings in accordance with the present invention was tested. Initially, twelve formulations were coated on 4 inch by 6 inch fiberglass plates and placed in sea water test racks at Woods Hole, Buzzards Bay, and Winthrop Harbor, Mass. Seven of these initial twelve formulations showed significant fouling resistance and the best six were placed in new racks along with several other formulations.

The formulations tested are listed in Table I. Variations of resin type and copper content were evaluated. After the first year of testing, it became apparent that copper contents of less than 35% were not antifouling and that 45% copper was marginal in most cases.

Flake size was also varied. A coarse flake, U.S. Bronze's C-100 (~100 mesh), a fine flake, USB 6500 (~325 mesh), and a 50-50 mixture of the two were used in several different formulations. The USB 6500 and the blend were tested for only one season, and no differences were apparent.

Table II summarizes the results of the three test sites. In general, the specimens at Mass. Maritime (Buzzards Bay) were not as heavily fouled as those at Woods Hole and Winthrop Harbor. The relative difference between specimens was the same however (i.e., the least fouled at Mass. Maritime was the least fouled at the other sites). There were differences in the fouling organisms at all three sites. Winthrop Harbor fouled the racks heavily with mussels, a greenish sludge and numerous round jelly-like organisms. Woods Hole fouled more heavily with algae, barnacles, and a flat jelly-like organism. Mass. Maritime had tube worms which were not present at either of the other two sites.

Two formulations looked particularly good after a two year exposure. They are formulations 3 and 4. Both contain 55% copper. Formula 3 showed moderate fouling at Winthrop Harbor after the second year but did not foul at either of the other two sites. At the Winthrop site, only the bottom ½ of the sample fouled significantly. The bottom ½ had previously been sanded to present a smoother surface. It is possible that the sanding smeared some of the resin over the exposed copper although no difference between top and bottom were noticed at the other test sites.

Formulation 4 showed no evidence of fouling at any of the test sites and also seemed to collect significantly less slime than the other formulations. This formulation is the only formulation that contains a polyglycol. Several other polyglycol containing resins were made and after one fouling season they all remain unfouled and had very little slime.

Formulation 8 which was thinned to make a flowable system that could be painted or sprayed showed no fouling after one year.

Substituting a conductive carbon black for copper in one of the better antifouling formulations showed that the copper was essential. Formulation 18 containing only carbon black fouled heavily.

Long antifouling life was expected for the formulations which show good electrical conductivity since this is taken to be an indication of particle to particle contact throughout the thickness of the piece. The resistance of several formulations was measured prior to placing the samples at the various test sites. The values are presented in Table III. There does not appear to be a direct correlation between conductivity and fouling resistance. However, there is a correlation between copper content and performance if the data in Table II is examined. It is likely that within a given copper filled formulation conductivity and fouling are related since in this case conductivity is related to copper content.

There are 10 formulations which have shown no fouling after one season of exposure at all three test sites.

TABLE I

| | | Test Formulations | | |
|---|---|---|---|---|
| | | | Variations | |
| Formulations | Parts | A | B | C |
| 1 Araldite 507 | 100 | 100 | 100 | 100 |
| TETA | 13 | 13 | 13 | 13 |
| USB C-100 | 138 | 92 | 61 | 138 untreated |
| 2 Araldite 6005 | 100 | 100 | 100 | |
| Ancamine 1510 | 30 | 30 | 30 | |
| USB C-100 | 158 | 106 | 70 | |
| 3 Araldite 6005 | 100 | 100 | 100 | |
| Epodil L | 15 | 15 | 15 | |
| TETA | 13 | 13 | 13 | |
| USB C-100 | 156 | 104 | 69 | |
| 4 Araldite 508 | 100 | | | |
| Araldite 6005 | 42.8 | | | |
| TETA | 18.4 | | | |
| USB C-100 | 202.8 | | | |
| 5 Araldite 6005 | 100 | | | |
| Thiokol LP3 | 50 | | | |
| DMP-30 | 10 | | | |
| USB C-100 | 196 | | | |
| 6 Araldite 507 | 100 | | | |
| TETA | 13 | | | |
| 7 Araldite 507 | 100 | 100 | | |
| TETA | 13 | 13 | | |
| USB 6500 | 138 | 138 untreated | | |
| 8 Araldite 507 | 100 | ⎫ | | |
| TETA | 13 | ⎬ Flowable | | |
| USB C-100 | 138 | ⎬ Formulation | | |
| Methyl Alcohol | 80 | ⎭ | | |
| 9 Araldite 507 | 100 | ⎫ No alcohol wash | | |
| TETA | 13 | ⎬ used in treating | | |
| USB C-100 | 138 | ⎭ the flake. | | |
| 10 DER 332 | 100 | ⎫ | | |
| Epicure 8071 | 28 | ⎬ Cured | | |
| Epicure 874 | 4 | ⎬ underwater | | |
| USB C-100 | 160 | ⎭ | | |
| 11 DER 332 | 100 | ⎫ | | |
| Araldite 850 | 70 | ⎬ Cured underwater | | |
| USB C-100 flake | 200 | ⎭ | | |
| 12 Araldite 508 | 100 | | | |
| DER 332 | 43 | | | |
| TETA | 18 | | | |
| USB 6500 | 200 | | | |
| 13 Araldite 507 | 100 | | | |
| TETA | 13 | | | |
| USB C-100 | 57 | | | |
| USB 6500 | 56 | | | |
| 14 ERL 2772 | 100 | | | |
| Epodil L | 15 | | | | mesh copper flake and USB 6500 is a 25 mesh copper flake.

Table II

| Formulation | Fouling Results* Woods Hole | Mass. Maritime | Winthrop Harbor | Comments |
|---|---|---|---|---|
| 1 | N, LF | N, LF | N, MF | Mass. Maritime & Woods Hole had only one organism on each plate after 2 years |
| 1A | N, MF | N, MF | N, MF | loose attachment |
| 1B | F | F | F | low Cu (35%) |
| 1C | N | N | N | |
| 2 | N, MF | N, MF | N, F | loose attachment |
| 2A | LF | LF | LF | 45% Cu |
| 2B | F | F | F | 35% Cu |
| 3 | N, N | N, N | N, MF | Bottom ½ only fouled |
| 3A | N | N | N | 45% Cu |
| 3B | LF | LF | F | 35% Cu |
| 4 | N, N | N, N | N, N | Less sliming than most |
| 5 | N, LF | N, N | N, MF | more slime than most |
| 6 | F | F | F | no copper |
| 7 | N | N | N | |
| 7A | LF | N | N | one barnacle on W.H. sample |
| 8 | N | N | N | Light edge growth on one sample |
| 9 | N | N | N | |
| 10 | MF | N | MF | underwater cure |
| 11 | LF | N | LF | mostly grass |
| 12 | N | N | N | very little slime |
| 13 | N | N | N | green |
| 14 | N | N | N | light slime, green, 50% Cu |
| 15 | — | N | — | Contains polyglycol as does formula 4 |
| 16 | F | F | F | control |
| 17 | F | F | F | no Cu, underwater cure |
| 18 | F | F | F | no Cu, contains carbon black |
| 19 | N | N | N | heat cured system |
| 20 | F | F | F | Teflon |
| 21 | N | N | N | 56% Cu, cured under polyethylene to give a smooth surface. |

*If two sets of letters are given, the first is for the first year of test, the second for the end of 2 years.
F = Fouled, N = no fouling, LF = light fouling, MF = moderately fouled

Test Formulations

| Formulations | Parts | Variations A | B | C |
|---|---|---|---|---|
| TETA | 13 | | | |
| USB C-100 | 64 | | | |
| USB 6500 | 64 | | | |
| 15 DER 332 | 50 | | | |
| DER 732 | 50 | | | |
| TETA | 13 | | | |
| USB C-100 | 69 | | | |
| USB 6500 | 69 | | | |
| 16 Uncoated fiberglass | | | | |
| 17 Devcon underwater curing Epoxy | | | | |
| 18 Araldite 507 | 100 | | | |
| TETA | 13 | | | |
| XC 72R Carbon Black | 51 | | | |
| 19 Araldite 507 | 100 | | | |
| XU 213 | 3 | Heat cured system | | |
| USB C-100 | 63 | | | |
| USB 6500 | 63 | | | |
| 20 Teflon sheet | | | | |
| 21 Araldite 507 | 100 | Flattened under a polyethylene sheet to give a smooth surface. | | |
| TETA | 13 | | | |
| USB C-100 | 144 | | | |
| 22 DER 332 | 50 | | | |
| DER 732 | 50 | Glycol containing underwater curing resin | | |
| Araldite 850 | 70 | | | |
| USB C-100 | 200 | | | |

USB C-100 and USB 6500 are tradenames for copper flake sold by U.S. Bronze Corp. USB C-100 is a 100

TABLE III

Electrical Conductivities of Antifouling Formulations

| Formulation No. | *Resistance (ave. 3 values) |
|---|---|
| 1 | 0.3 ohms |
| 1C | > 500 K |
| 7 | 0.3 |
| 7A | > 1000 K |
| 9 | 0.5 |
| 10 | 1.2 |
| 11 | 50.0 |
| 12 | 1.2 |

*Between test probes a 3" span on actual test specimens.

The foregoing tests indicate that in order for the polymer to be anti-fouling it should contain 50% or more by weight of copper. A test sample with this amount of copper will have an electrical resistance of less than 50 ohms. The tests also indicate that only a gel coat which contains a glycol has significant anti-sliming properties.

As has been stated above, one embodiment of the gel coat of the present invention can be cured under water. Details on this embodiment appear below.

An ordinary bisphenol A based epoxy resin is mixed with treated copper flake. The mix is then blended with a hardner which will cure underwater such as Ciba-Geigy's Hardner 850 or Celanese's Epicure 8071 and 874 (see test formulations 10 and 11). The mixed resin is then placed on a plastic film such as polyethylene from which it can be transferred by a diver or some mechanical mechanism to the surface of the underwater object to be coated. After a 24 hour cure, the polyethylene can be stripped away leaving the copper-resin surface exposed.

A glycol containing anti-sliming formulation is illustrated in formulation #22.

From the foregoing it should be clear that an essential requirement of the gel coat of the present invention is that it comprise a cured epoxy resin containing 50% or more of copper flake which has been treated to remove copper oxides. It is preferable that the copper flake be of the size between the range of 100–325 mesh (U.S. Sieve Series). It is also preferable that the epoxy be a bisphenol A type epoxy. For embodiments of the invention where anti-sliming properties is also desirable, a polyol is included in the epoxy formulation. In such cases, the polyol should comprise between 5–30 weight percent of the total gel coat composition, that is 5–30% of the total weight of the resin, additives, and the copper. It is also desirable that the polyol (polyglycol) that is selected for inclusion in the epoxy resin be such that the epoxy equivalent weight range of the polyglycol is between the range of 100–500.

As has been stated above, the resin or gel coat of the present invention is utilized to provide anti-fouling properties to water craft and conduits. The term "water craft" is used in its broadest sense and is intended to cover any object which floats or is immersed in water. Thus, "water craft" is intended to cover stationary pilings for piers, bouys of all sizes as well as ship hulls. Likewise, the term "conduit" is intended to describe any tube or tubular structure. Thus, the gel coat or resin of the present invention can be utilized to coat large tunnels used, for example, in nuclear power plants to conduct cooling sea water as well as the smallest tubing which might also be utilized to deliver sea water from one place to another.

Figure 2:
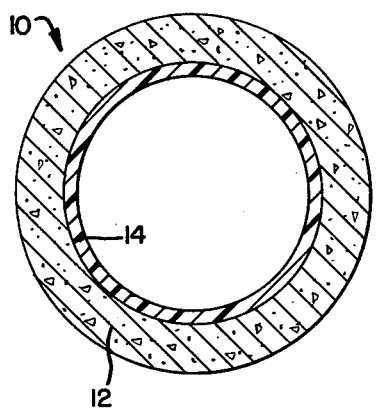
FIG. 2 is a view of a concrete tunnel which is lined with an anti-fouling material of the present invention.

An example of a utility intake tunnel is shown in FIG. 2. Such structures can be coated with a resin in accordance with the present invention to make them anti-fouling. For example, a 6 foot diameter utility cooling water tunnel 10 formed from concrete 12 can be coated with a gel coat in accordance with the present invention. To accomplish the foregoing, formulation 4 is applied to the tunnel 10 by spraying it on the inside wall of the tunnel. This technique is commonly used by boat manufacturers. The spraying would be continued until a coating 14 approximately 1/16th of an inch thick resulted.

Of course, smaller conduits can be coated with the epoxy of the present invention by techniques well known in this art. For fiberglass reinforced plastic piping, the resin can be troweled onto the mandrel used to manufacture the pipe.

Figure 3:
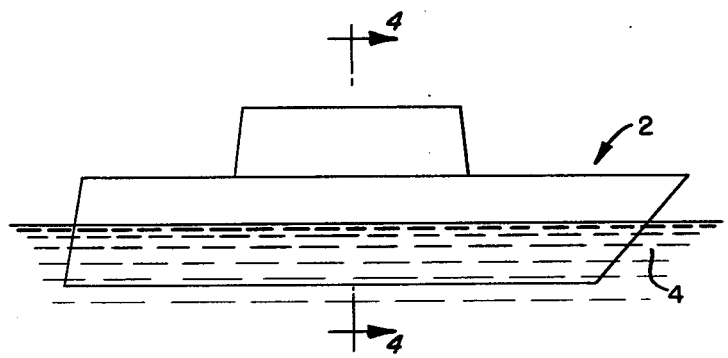
FIG. 3 is a view of a boat hull which is coated with the anti-fouling material of the present invention.
Figure 4:
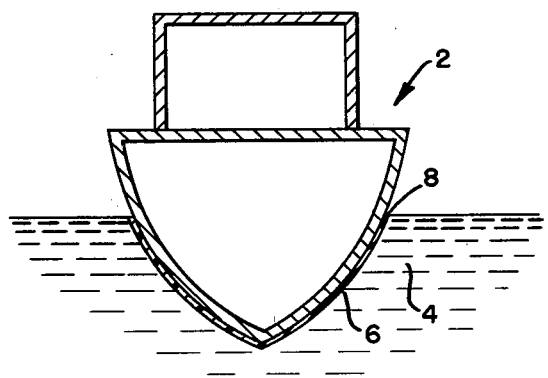
FIG. 4 is a cross sectional view taken along line 4—4 of FIG. 3.

FIG. 3 shows a boat having a gel coat in accordance with the present invention and FIG. 4 is a cross sectional view taken along line 4—4 of FIG. 3. Referring more specifically to the drawing, the boat 2 in water 4 has a coating 6 of the gel coat of the present invention below the water line 8. The procedure for coating such a boat hull is similar to the procedure utilized for coating the intake tunnel. In this case a formulation such as formulation 4 is sprayed into a female mold. The backing resin is then put into the mold and the glass mat is applied to form the hull.

Figure 5:
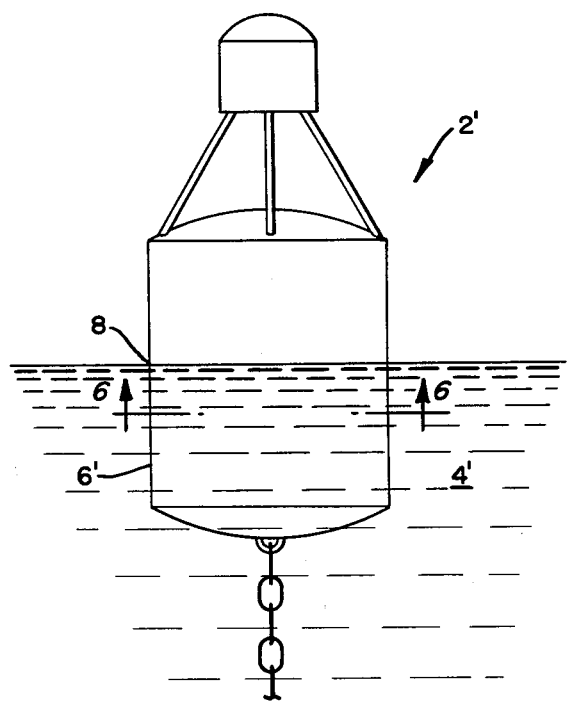
FIG. 5 is a view of a navigational bouy which is coated with the anti-fouling material of the present invention; and, FIG. 6 is a cross sectional view taken along line 6—6 of FIG. 5.
Figure 6:
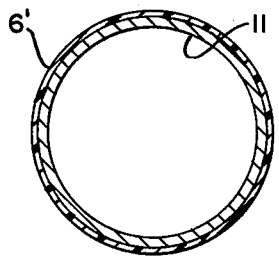

The present invention can be utilized to coat navigational bouys as well as other floats. A significant problem which develops when navigational bouys are in the water for any prolonged period of time is that they become so fouled that they are weighted down to a point where they must be removed from the water, scraped, and repositioned. This, of course, is an expensive operation. By coating navigational bouys and other floats with the gel coat of the present invention, the bouys do not require tending as frequently as they would otherwise require. FIG. 5 shows a bouy having a gel coat in accordance with the present invention and FIG. 6 is a sectional view along line 6—6 of FIG. 5. Referring more specifically to FIGS. 5 and 6, the bouy 2' in water 4' has a coating 6' of a gel coat in accordance with the present invention below the water line 8'. Such bouys can be made anti-fouling by either spraying or troweling the resin 6' and allowing it to cure over the substrate 11. Of course, because of the high copper content of the gel coat, it would not be applied directly over steel, since this arrangement would produce galvanic action which would corrode the bouy. Smaller bouys and floats can be simply dipped into the gel coat before it is cured and then allowed to cure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A coating material which exhibits anti-fouling and anti-sliming properties comprising a cured resin formed from an epoxy resin coreacted with an epoxidized polyol and a curing agent, said cured resin containing copper flake, said copper flake being treated to remove impurities and oxides and being present in sufficient quantities so that the copper flake comprises 50% or more of the weight of the gel coat.

2. The coating material as set forth in claim 1 wherein the cured resin is formed from an uncured epoxy resin having a viscosity less than 12,000 cps.

3. The coating material as set forth in claim 1 wherein the epoxidized polyol is present in sufficient quantities to comprise 5–30% of the total weight of the coating material.

4. The coating material as set forth in claim 1 wherein the epoxidized polyol has an epoxy equivalent weight within the range of 100–500.

5. The coating material as set forth in claim 1 wherein said epoxy resin is a bisphenol A type epoxy resin.

6. The coating material as set forth in claim 1 wherein the particle size of said copper flake is between the range of 100–325 mesh.

7. The coating material as set forth in claim 1 wherein said epoxidized polyol is a polypropylene glycol glycidyl ether.

8. The coating material as set forth in claim 1 wherein said cured resin is formed with a curing agent which cures underwater.

9. The coating material as set forth in claim 1 wherein the epoxidized polyol which is coreacted with said epoxy resin has the following generalized formula:

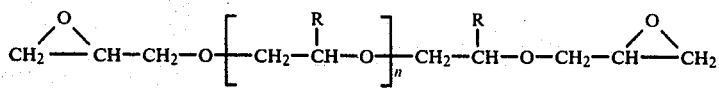
* * * * *